United States Patent
Chang et al.

(10) Patent No.: US 8,844,814 B2
(45) Date of Patent: Sep. 30, 2014

(54) RADIO FREQUENCY IDENTIFICATION AUTOMATIC DETECTING SYSTEM WITH ANTENNA NET

(71) Applicants: Tai-Hwa Liu, Hsinchu (TW); Yi-Chun Sung, Hsinchu (TW)

(72) Inventors: Li-Chih Chang, Hsinchu (TW); Tai-Hwa Liu, Hsinchu (TW); Yi-Chun Sung, Hsinchu (TW); Cheng-Lun Yin, Hsinchu (TW)

(73) Assignees: Tai-Hwa Liu, Hsinchu (TW); Yi-Chun Sung, Hsinchu (TW)

( * ) Notice: Subject to any disclaimer, the term of this patent is extended or adjusted under 35 U.S.C. 154(b) by 0 days.

(21) Appl. No.: 13/709,277

(22) Filed: Dec. 10, 2012

(65) Prior Publication Data
US 2014/0158765 A1 Jun. 12, 2014

(51) Int. Cl.
| | |
|---|---|
| G06K 7/00 | (2006.01) |
| G06K 19/06 | (2006.01) |
| G06F 19/00 | (2011.01) |
| H01Q 9/04 | (2006.01) |
| G06K 7/10 | (2006.01) |
| H01Q 13/20 | (2006.01) |
| H01Q 13/22 | (2006.01) |
| G06K 17/00 | (2006.01) |
| G06Q 10/08 | (2012.01) |

(52) U.S. Cl.
CPC .... *G06K 7/10009* (2013.01); *G06K 2017/0051* (2013.01); *G06Q 10/08* (2013.01); *G06Q 10/087* (2013.01); *H01Q 13/203* (2013.01); *G06K 7/10178* (2013.01); *H01Q 13/22* (2013.01); *G06K 7/10316* (2013.01)

USPC ........... 235/439; 235/385; 235/435; 235/492; 343/791; 700/115

(58) Field of Classification Search
CPC ............................................. G06K 2017/0051
USPC .................. 235/385, 435, 439, 492; 700/115; 340/10.1; 343/791
See application file for complete search history.

(56) References Cited

U.S. PATENT DOCUMENTS

| | | | | |
|---|---|---|---|---|
| 5,473,336 | A | * | 12/1995 | Harman et al. ................ 343/790 |
| 2002/0130817 | A1 | * | 9/2002 | Forster et al. .................. 343/770 |
| 2002/0183882 | A1 | * | 12/2002 | Dearing et al. ................ 700/115 |
| 2004/0164864 | A1 | * | 8/2004 | Chung et al. ................ 340/572.7 |
| 2005/0146474 | A1 | * | 7/2005 | Bannon ......................... 343/767 |
| 2005/0156739 | A1 | * | 7/2005 | Maloney .................... 340/572.1 |
| 2007/0001809 | A1 | * | 1/2007 | Kodukula et al. ............ 340/10.1 |

(Continued)

Primary Examiner — Steven S Paik
Assistant Examiner — Claude J Brown
(74) Attorney, Agent, or Firm — Lin & Associates IP, Inc.

(57) ABSTRACT

A radio frequency identification automatic detecting system with an antenna net includes a radio frequency identification module, an enhancing surface wave-guide coaxial cable structure including a coaxial cable having at least one aperture region without an outer conducting layer, a receiving apparatus having a plurality of receiving spaces and a plurality of extension wires disposed adjacent to the receiving spaces and coupled or connected to the outer conducting layer of the coaxial cable. The electromagnetic field is formed in nearby regions adjacent to the receiving spaces because the electromagnetic wave caused by the current generated from the radio frequency identification module is transmitted by the outer conducting layer and extension wires. The radio frequency identification electronic tag on the object is triggered automatically when the object is moved toward or moved out from the respective receiving space such that the automatic detecting effect is achieved.

7 Claims, 3 Drawing Sheets

(56) References Cited

U.S. PATENT DOCUMENTS

| | | | |
|---|---|---|---|
| 2007/0176840 A1* | 8/2007 | Pristas et al. | 343/841 |
| 2007/0296596 A1* | 12/2007 | Moore | 340/572.7 |
| 2008/0117053 A1* | 5/2008 | Maloney | 340/572.4 |
| 2008/0314980 A1* | 12/2008 | Folcke et al. | 235/385 |
| 2009/0027202 A1* | 1/2009 | Copeland et al. | 340/572.1 |
| 2009/0073820 A1* | 3/2009 | McIntosh et al. | 369/34.01 |
| 2009/0243797 A1* | 10/2009 | Leung et al. | 340/5.73 |
| 2010/0060453 A1* | 3/2010 | Kushida et al. | 340/572.1 |
| 2010/0123551 A1* | 5/2010 | Fritchie | 340/10.1 |
| 2011/0273362 A1* | 11/2011 | Tuttle | 343/905 |
| 2012/0326729 A1* | 12/2012 | Faxvog et al. | 324/627 |

* cited by examiner

RADIO FREQUENCY IDENTIFICATION AUTOMATIC DETECTING SYSTEM WITH ANTENNA NET

BACKGROUND OF THE INVENTION

1. Field of the Invention

The present invention generally relates to a radio frequency identification automatic detecting system with an antenna net, more specifically to a radio frequency identification automatic detecting system having an enhancing surface waveguide coaxial cable with net structure, which is adapted to generate electromagnetic (EM) wave along the coaxial surface and radiate to air from aperture for auto-detecting objects provided with radio frequency identification electronic tags.

2. The Prior Arts

As long as the magnitude of warehouse or amount of servers increases recently, traditional security management system has to increase the monitors or security staffs, such that it requires to greatly increase the equipment or labor costs. Unfortunately, the problems such as high-cost goods are stolen from the safety boxes and the theft often occurs in the warehouses. Hence, it urgently requires lots of manual labors, equipments and time for checking the warehouses. Therefore, improvement for problems described above is indispensable and is required to be treated urgently and immediately.

Ultra high frequency detecting technology is a distant wireless communication system; the system is mainly utilized for an electronic tag, and includes a reader and an antenna unit. When the electronic tag enters into an electromagnetic field that can be detected by the antenna unit, the electronic tag is triggered by a wireless signal, and then the electronic tag transmits back an identification signal to the reader through the antenna unit, where the reader reads the information from the memory of the electronic tag after confirming the identification signal.

Nowadays, the antenna unit of the ultra high frequency detecting technology is designed thinner and lighter, and is broadly used in management of product logistics in hypermarkets, entrance gate, bookstores, documents, medicines, clothes, high-cost goods, such as jewelry. However, the general operation method is that a person must carry a radio frequency identification reader to read the electronic tags attached to products or objects one by one, such that the labor cost and time is restricted. In addition, the triggering range and distance is not enough, so that even through there are some automatic triggering methods; the cost is still too high for practical application.

Therefore, a radio frequency identification electronic device, which is cheaper in cost and which can trigger the electronic tag automatically is required urgently.

SUMMARY OF THE INVENTION

An objective of the present invention to provide a radio frequency identification automatic detecting system with an antenna net, which includes a radio frequency identification module, an enhancing surface wave-guide coaxial cable structure, a receiving apparatus of net type and a plurality of extension conductive wires. The radio frequency identification module includes a signal processing device and a radio frequency identification transmitting/receiving device. The signal processing device is electrically connected to or connected wirelessly to radio frequency identification transmitting/receiving device. The radio frequency identification transmitting/receiving device is adapted to generate a current. The receiving apparatus has a plurality of receiving spaces arranged in an array. Each of the receiving spaces is used to accommodate an object provided with a radio frequency identification electronic tag.

The coaxial cable structure is disposed in the receiving apparatus and includes a coaxial cable and an end matching device. An inner conducting layer of the coaxial cable is extended outward from the receiving apparatus and is used to connect to the radio frequency identification transmitting/receiving device. The coaxial cable has at least one aperture region without an outer conducting layer. The end matching device is coupled or connected to the inner conducting layer and the outer conducting layer at one end of the enhancing surface wave-guide coaxial cable structure, and an insulating layer is disposed between the inner conducting layer and the outer conducting layer in order to isolate the two from each other. Each of the extension wires is disposed in a portion of the receiving apparatus, and is connected to the outer conducting layer. The position of each extension wire is located adjacent to one line or one column of the receiving spaces.

When the current generated by the radio identification transmitting/receiving device flows along the inner conducting layer of the coaxial cable through the aperture region, an electromagnetic (EM) wave leakage is resulted so as to form an electromagnetic field. The EM wave is transmitted along the outer conducting layer and the extension wires, such that the electromagnetic field is built up in nearby regions adjacent to the receiving spaces. When the object provided with the radio frequency identification electronic tag moves toward or moves away from the receiving space, the radio frequency identification electronic tag is automatic trigged by the electromagnetic field. Then, the information stored in the radio frequency identification electronic tag is transmitted to the radio frequency identification transmitting/receiving device, which, in turn, transmits the information stored in the radio frequency identification electronic tag to the signal processing device.

If the receiving apparatus is made from metal and in the event there occurs metal shielding effect among the metal plates defining the receiving spaces, an opening should be formed on a wall of each receiving space or the metal plate, and the branch wires of the extension wires can be inserted into the openings, such that the problem due to the metal shielding effect can be overcome.

The technical features of the present invention is that the EM wave leakage is resulted when the current generated by the radio frequency identification transmitting/receiving device flows through the enhancing surface wave-guide coaxial cable structure, such that an electromagnetic field is thus formed. The EM wave is transmitted further by the outer conducting layer and extension wires, such that range of the electromagnetic field becomes broader. Therefore, the enhancing surface wave-guide coaxial cable structure can be applied in large racks or cabinets so as to manage the objects stored therein. The radio frequency identification electronic tag provided on the object is triggered automatically by the electromagnetic field once the object is moved toward or moves away, and the information stored in the respective tag is transmitted to the signal processing device, such that the automatic detecting effect is achieved. Hence, the management of things or object is easier and the manual labor cost is accordingly reduced.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. Modifications of the shape of the present invention shall too be considered to be within the spirit of the present invention.

Figure 1:
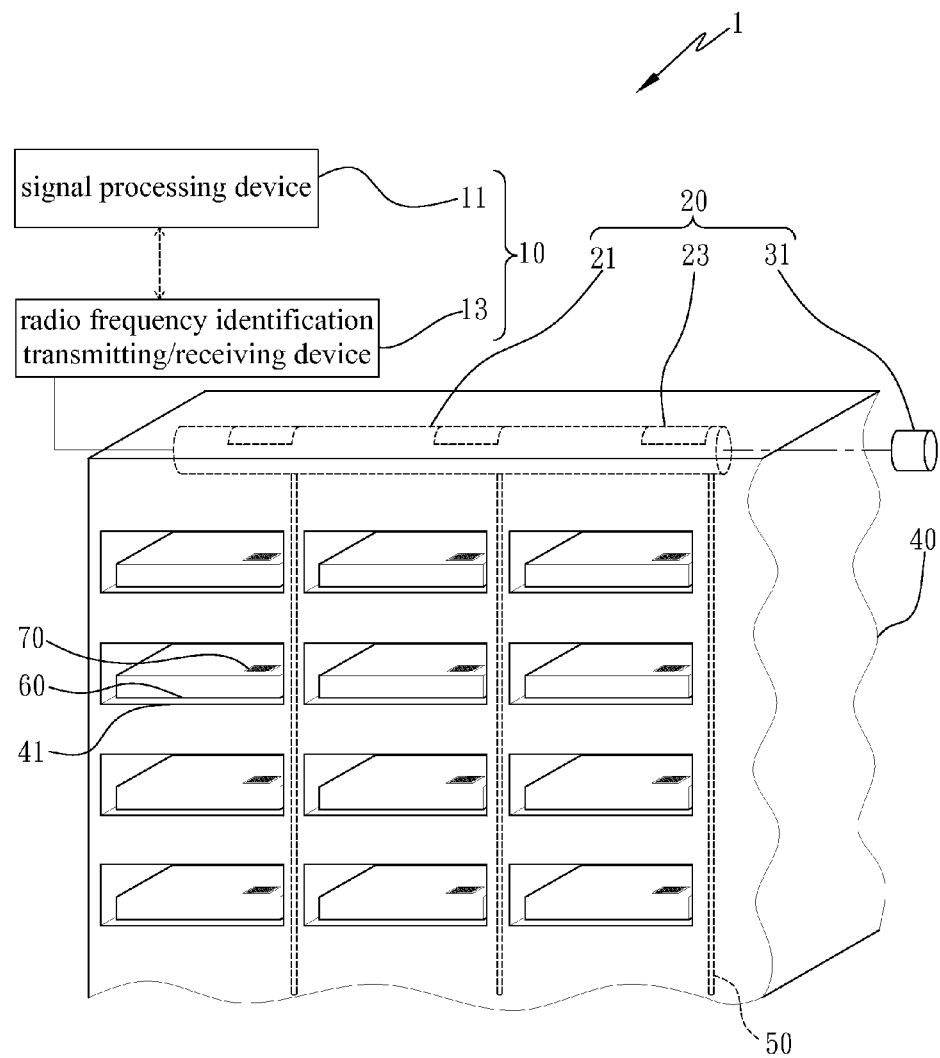
FIG. 1 illustrates a schematic drawing of a radio frequency identification automatic detecting system with an antenna net of the first embodiment of the present invention.

FIG. 1 illustrates a schematic drawing of a radio frequency identification automatic detecting system with an antenna net of the first embodiment of the present invention. As shown in FIG. 1, the radio frequency identification automatic detecting system with an antenna net 1 of the present invention includes a radio frequency identification module 10, an enhancing surface wave-guide coaxial cable structure 20, a receiving apparatus 40 of net type and a plurality of extension wires 50. The radio frequency identification module 10 includes a signal processing device 11 and a radio frequency identification transmitting/receiving device 13. The signal processing device 11 is a host or a programmable single IC, and is electrically connected to or wirelessly connected to the radio frequency identification transmitting/receiving device 13. The radio frequency identification transmitting/receiving device 13 is connected to the enhancing surface wave-guide coaxial cable structure 20 and generates a current. The receiving apparatus 40 is a rack or a cabinet, which has a plurality of receiving spaces 41 arranged in an array. Each of the receiving spaces 41 is used to accommodate an object 60 provided with a radio frequency identification electronic tag 70. Each of the extension wires 50 is disposed in a portion of the receiving apparatus 40, and is adjacent to one line or one column of the receiving spaces 41.

Figure 2A:
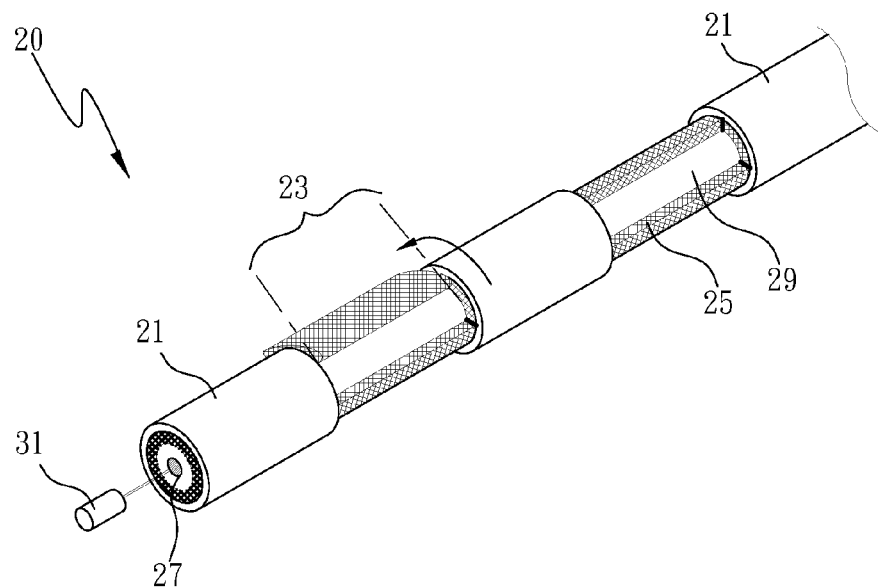
FIG. 2A is a schematic diagram of one embodiment of the enhancing surface wave-guide coaxial cable structure employed in the detecting system of the present invention.

FIG. 2A is a schematic diagram of one embodiment of the enhancing surface wave-guide coaxial cable structure employed in the detecting system of the present invention. As illustrated in FIG. 1 and FIG. 2A, the enhancing surface wave-guide coaxial cable structure 20 is disposed in the receiving apparatus 40 and is connected electrically to the radio frequency identification transmitting/receiving device 13 and the extension wires 50. The coaxial cable structure 20 includes a coaxial cable 21 having at least one aperture region 23 without an outer conducting layer 25, and an end matching device 31. An inner conducting layer 27 of the coaxial cable 21 extends outward from the receiving apparatus 40 and is used to connect with the radio frequency identification transmitting/receiving device 13. The outer conducting layer 25 is coupled or connected electrically to the extension wires 50. An insulating layer 29 is disposed between the inner conducting layer 27 and the outer conducting layer 25 in order to separate and isolate the two relative to each other. As can be seen in FIG. 2A, the aperture regions are formed 23 in and surrounded by the outer conducting layer 25 with the insulating layer 29 exposed. The end matching device 31 is connected to the inner conducting layer 27 and the outer conducting layer 25 at one end of the enhancing surface wave-guide coaxial cable structure 20 to form an opening path, a close path or a short circuit for the current in the coaxial cable 21.

The current generated by the radio identification transmitting/receiving device 13 flows along the inner conducting layer 27 of the coaxial cable 21, and generates an electromagnetic (EM) wave leakage while the current flows through the aperture region 23, such that an electromagnetic field is resulted. The EM wave is transmitted along the outer conducting layer 25 and the extension wires 50, such that the surface wave-guide effect can be enhanced and the EM wave is transmitted to the nearby regions adjacent to the receiving spaces 41. The effective range of the electromagnetic field is within a radius of 0 to 250 cm centered from the coaxial cable 21 and the extension wires 50. When the object or product provided with the radio frequency identification electronic tag 70 is moved toward or is moved away from the receiving space 50, the radio frequency identification electronic tag 70 is automatic trigged by the electromagnetic field. Then, the information stored in the radio frequency identification electronic tag 70 is transmitted to the radio frequency identification transmitting/receiving device 13, which, in turn, transmits the information to the signal processing device 11. Therefore, the status of the objects 60 can be automatic detected such that the management of the objects 60 is much easier.

Figure 2B:
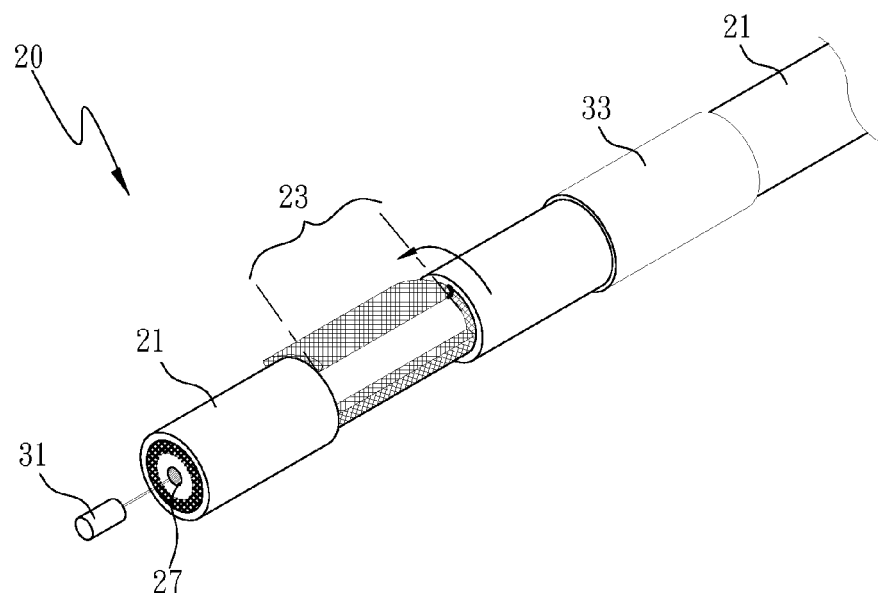
FIG. 2B is a schematic diagram of another embodiment of the enhancing surface wave-guide coaxial cable structure employed in the detecting system of the present invention.

FIG. 2B is a schematic diagram of another embodiment of the enhancing surface wave-guide coaxial cable structure employed in the detecting system of the present invention. As shown in FIG. 2B, in this embodiment the aperture region 23 of the enhancing surface wave-guide coaxial cable structure 20 is covered by an insulating tape 33 to protect the structure of the coaxial cable 21.

Figure 3:
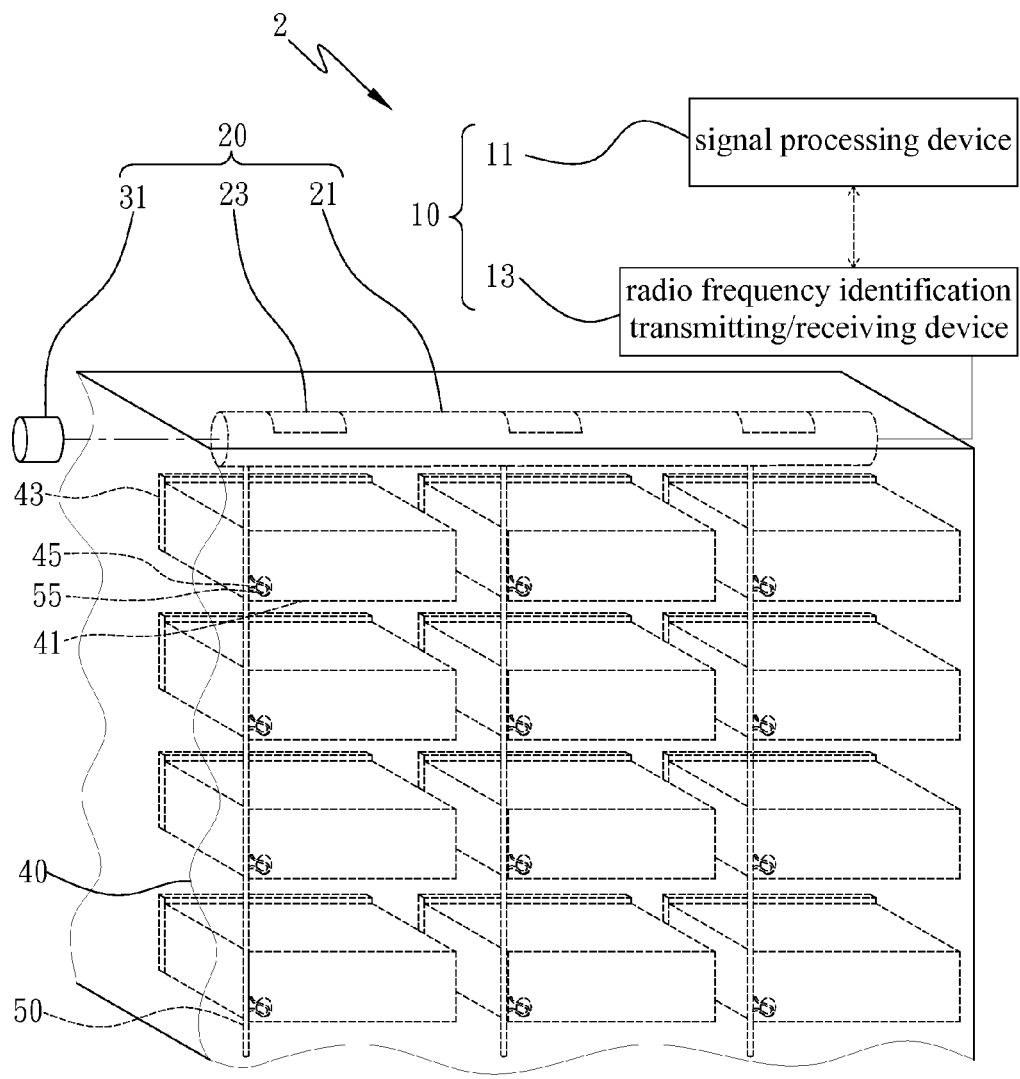
FIG. 3 illustrates a schematic drawing of the radio frequency identification automatic detecting system with the antenna net of the second embodiment of the present invention.

FIG. 3 illustrates a schematic drawing of the second embodiment of the radio frequency identification automatic detecting system with the antenna net of the present invention. As shown in FIG. 3, the second embodiment of the radio frequency identification automatic detecting system 2 of the present invention is similar to the first embodiment. The only difference resides in that the receiving apparatus 40 is made from metal, and includes a plurality metal plates 43 to define the receiving spaces 41. For example, the receiving apparatus 40 is a safety cabinet. If the second embodiment is implemented as the first embodiment, the object 60 with the radio frequency identification electronic tag 70 can not be detected by the electromagnetic field due to the metal shielding effect caused by the metal plates 43. Therefore, in the second embodiment, an opening 45 is formed through a wall of each receiving space 41 or in the metal plate 45, and the branched wires 55 from the extension wires 50 extend into the openings 45 in the metal plates 45, such that the problem of the metal shielding effect is overcome.

The technical features of the present invention is that the EM wave leakage is resulted when the current generated by radio frequency identification transmitting/receiving device flows through the enhancing surface wave-guide coaxial cable structure, such that an electromagnetic field is thus formed. And the EM wave is transmitted further by the outer conducting layer and extension wires, such that range of the electromagnetic field becomes broader. Therefore, the enhancing surface wave-guide coaxial cable structure can be applied in management of the objects. The radio frequency identification electronic tag disposed on the object is triggered automatically by the electromagnetic field when the object is moved toward or moved out from the respective receiving space, and the information can be transmitted to the signal processing device, such that the automatic detecting effect is achieved, the management of object is easier and the managing labor cost is accordingly reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A radio frequency identification automatic detecting system with an antenna net, comprising:
a radio frequency identification module including a signal processing device and a radio frequency identification transmitting/receiving device, the signal processing device electrically wired or connected wirelessly to the radio frequency identification transmitting/receiving device, and the radio frequency identification transmitting/receiving device being utilized to generate a current;
a receiving apparatus of array type having a plurality of receiving spaces arranged in an array manner, each of the receiving spaces being used for accommodating an object provided with a radio frequency identification electronic tag;
an enhancing surface wave-guide coaxial cable structure disposed in the receiving apparatus and including a coaxial cable having at least one aperture region formed in an outer conducting layer, and an end matching device, wherein an inner conducting layer of the coaxial cable is connected to the radio frequency identification transmitting/receiving device, the end matching device is connected to the inner conducting layer and the outer conducting layer at one end of the coaxial cable, wherein an insulating layer is disposed between the outer conducting layer and the inner conducting layer in order to isolate therebetween and exposed through the at least one aperture region surrounded by the outer conducting layer; and
a plurality of extension wires disposed in a portion of the receiving apparatus and coupled or connected to the outer conducting layer of the coaxial cable, wherein each of the plurality of extension wires is located adjacent to one line or one column of the receiving spaces,
wherein, when the current generated by the radio identification transmitting/receiving device flows along the inner conducting layer of the coaxial cable through the aperture region, an electromagnetic wave leakage is resulted so as to form an electromagnetic field, and an electromagnetic wave is transmitted along the outer conductive layer of the coaxial cable to the extension wires so that the electromagnetic field is transmitted to nearby regions adjacent to the receiving spaces, and wherein, when the object with the radio frequency identification electronic tag approaches toward or moves away from the receiving space, the radio frequency identification electronic tag is automatically trigged by the electromagnetic field, and information stored in the radio frequency identification electronic tag is transmitted to the radio frequency identification transmitting/receiving device, which, in turn, further transmits the information to the signal processing device.

2. The radio frequency identification automatic detecting system as claimed in claim 1, wherein an effective range of the electromagnetic field is within a radius of 0 to 250 cm centered from the coaxial cable and the extension wires.

3. The radio frequency identification automatic detecting system as claimed in claim 1, wherein the end matching device forms an opening path, a close path or a short circuit for the current in the coaxial cable.

4. The radio frequency identification automatic detecting system as claimed in claim 1, wherein the signal processing device is a host or a programmable single IC.

5. The radio frequency identification automatic detecting system as claimed in claim 1, wherein the enhancing surface wave-guide coaxial cable structure further includes at least one insulating tape to cover the aperture region.

6. The radio frequency identification automatic detecting system as claimed in claim 1, wherein the receiving apparatus is made from metal and has a plurality of metal plates for enclosing the receiving spaces, an opening being formed on a wall of each receiving space or on the metal plate.

7. The radio frequency identification automatic detecting system as claimed in claim 6, wherein each of the extension wires has a plurality of branch wires extending into the openings in the walls of the receiving spaces or on the metal plates.

* * * * *